US012684545B2

(12) United States Patent
Pant et al.

(10) Patent No.: US 12,684,545 B2
(45) Date of Patent: Jul. 14, 2026

(54) TECHNIQUES FOR CONFIGURING USER EQUIPMENT SUPPORTED CARRIER AGGREGATION BAND COMBINATIONS

(71) Applicant: QUALCOMM Incorporated, San Diego, CA (US)

(72) Inventors: Nitin Pant, San Diego, CA (US); Honey Kakkar, San Diego, CA (US); Muralidharan Murugan, Hyderabad (IN); Xuepan Guan, San Diego, CA (US); Parastoo Kheirkhah, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 18/044,133

(22) PCT Filed: Nov. 8, 2021

(86) PCT No.: PCT/US2021/072291
§ 371 (c)(1),
(2) Date: Mar. 6, 2023

(87) PCT Pub. No.: WO2022/099315
PCT Pub. Date: May 12, 2022

(65) Prior Publication Data
US 2023/0337202 A1      Oct. 19, 2023

(30) Foreign Application Priority Data
Nov. 9, 2020    (IN) .............................. 202041048804

(51) Int. Cl.
*H04W 72/0453*      (2023.01)
*H04L 5/00*      (2006.01)
*H04W 72/51*      (2023.01)

(52) U.S. Cl.
CPC ......... *H04W 72/0453* (2013.01); *H04L 5/001* (2013.01); *H04W 72/51* (2023.01)

(58) Field of Classification Search
None
See application file for complete search history.

(56) References Cited

U.S. PATENT DOCUMENTS

2018/0049213 A1      2/2018   Gholmieh et al.
2018/0262905 A1      9/2018   Dhanapal et al.
(Continued)

FOREIGN PATENT DOCUMENTS

CN          109587679 A       4/2019

OTHER PUBLICATIONS

International Search Report and Written Opinion—PCT/US2021/072291—ISA/EPO—Feb. 22, 2022.

*Primary Examiner* — Robert M Morlan
(74) *Attorney, Agent, or Firm* — Harrity & Harrity LLP/Quantumm Incorporated

(57)      ABSTRACT

Various aspects of the present disclosure generally relate to wireless communication. In some aspects, a user equipment (UE) may transmit first capability information indicating a first set of band configurations. The UE may transmit, after the transmission of the first capability information, second capability information indicating a second set of band configurations. The UE may receive information indicating a band configuration, wherein the band configuration that is not included in at least one of the first set of band configurations or the second set of band configurations. The UE may communicate using the band configuration. Numerous other aspects are provided.

30 Claims, 11 Drawing Sheets

(56) References Cited

U.S. PATENT DOCUMENTS

2019/0215886 A1*   7/2019   Lee ....................... H04W 48/10
2020/0022036 A1    1/2020   Lee et al.
2020/0260265 A1    8/2020   Jin et al.
2020/0329369 A1    10/2020  Pals et al.
2020/0329523 A1    10/2020  Yi et al.
2020/0351638 A1*   11/2020  Kim ....................... H04W 8/22

* cited by examiner

800

810 Receive band configuration

820 UE determines if band configuration is indicated by last advertised capability 830 UE determines if band configuration is supported by UE 840 Accept band configuration and send configuration complete to NW

850 RLF

YES

NO

NO

YES

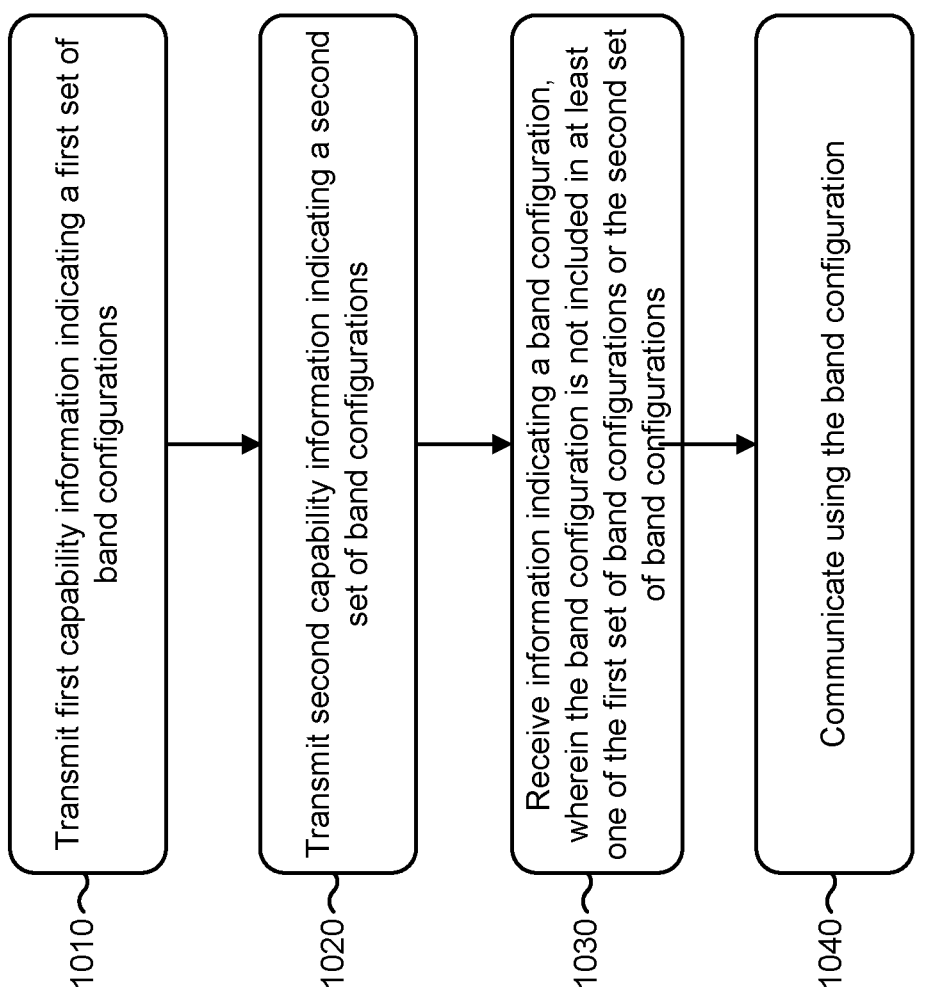

1010 Transmit first capability information indicating a first set of band configurations 1020 Transmit second capability information indicating a second set of band configurations 1030 Receive information indicating a band configuration, wherein the band configuration is not included in at least one of the first set of band configurations or the second set of band configurations 1040 Communicate using the band configuration

TECHNIQUES FOR CONFIGURING USER EQUIPMENT SUPPORTED CARRIER AGGREGATION BAND COMBINATIONS

CROSS-REFERENCE TO RELATED APPLICATIONS

This Patent Application is a 371 national stage of PCT Application No. PCT/US2021/072291 filed on Nov. 8, 2021, entitled "TECHNIQUES FOR CONFIGURING USER EQUIPMENT SUPPORTED CARRIER AGGREGATION BAND COMBINATIONS," which claims priority to Indian Provisional Patent Application No. 202041048804, filed on Nov. 9, 2020, entitled "TECHNIQUES FOR CONFIGURING UE-SUPPORTED CARRIER AGGREGATION BAND COMBINATIONS," which are hereby expressly incorporated by reference herein.

FIELD OF THE DISCLOSURE

Aspects of the present disclosure generally relate to wireless communication and to techniques and apparatuses for configuring user equipment (UE) supported carrier aggregation band combinations.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting first capability information indicating a first set of band configurations. The method may include transmitting, after transmission of the first capability information, second capability information indicating a second set of band configurations. The method may include receiving information indicating a band configuration, wherein the band configuration is not included in at least one of the first set of band configurations or the second set of band configurations. The method may include communicating using the band configuration.

Some aspects described herein relate to a UE for wireless communication. The user equipment may include a memory and one or more processors coupled to the memory. The one or more processors may be configured to transmit first capability information indicating a first set of band configurations. The one or more processors may be configured to transmit, after transmission of the first capability information, second capability information indicating a second set of band configurations. The one or more processors may be configured to receive information indicating a band configuration, wherein the band configuration is not included in at least one of the first set of band configurations or the second set of band configurations. The one or more processors may be configured to communicate using the band configuration.

Some aspects described herein relate to a non-transitory computer-readable medium that stores a set of instructions for wireless communication by a UE. The set of instructions, when executed by one or more processors of the UE, may cause the UE to transmit first capability information indicating a first set of band configurations. The set of instructions, when executed by one or more processors of the UE, may cause the UE to transmit, after transmission of the first capability information, second capability information indicating a second set of band configurations. The set of instructions, when executed by one or more processors of the UE, may cause the UE to receive information indicating a band configuration, wherein the band configuration is not included in at least one of the first set of band configurations or the second set of band configurations. The set of instructions, when executed by one or more processors of the UE, may cause the UE to communicate using the band configuration.

Some aspects described herein relate to an apparatus for wireless communication. The apparatus may include means for transmitting first capability information indicating a first set of band configurations. The apparatus may include means for transmitting, after transmission of the first capability information, second capability information indicating a second set of band configurations. The apparatus may include means for receiving information indicating a band configuration, wherein the band configuration is not included in at least one of the first set of band configurations or the second set of band configurations. The apparatus may include means for communicating using the band configuration.

In some aspects, a method of wireless communication performed by a user equipment (UE) includes transmitting capability information indicating a set of band configurations; receiving information indicating a band configuration, wherein the band configuration is supported by the UE and is not indicated by the capability information; and communicating using the band configuration based at least in part on the band configuration being supported by the UE.

In some aspects, the band configuration comprises a Long Term Evolution carrier aggregation configuration.

In some aspects, the band configuration comprises a multi radio access technology dual connectivity configuration.

In some aspects, the band configuration comprises a New Radio carrier aggregation configuration.

In some aspects, the band configuration indicates a multiple-input multiple-output configuration for one or more bands.

In some aspects, the band configuration indicates a modulation scheme configuration for one or more bands.

In some aspects, the band configuration relates to a group of bands.

In some aspects, the method includes determining whether the band configuration is supported by the UE; and determining whether to indicate invalid configuration based at least in part on whether the band configuration is supported by the UE.

In some aspects, the method includes determining that the band configuration is not indicated by the capability information, wherein the determination of whether the band configuration is supported by the UE is based at least in part on the determination that the band configuration is not indicated by the capability information.

In some aspects, the UE is associated with a first mode and a second mode, wherein the determination of whether the band configuration is supported by the UE is irrespective of whether the band configuration is indicated by the capability information based at least in part on being in the first mode, and wherein, in the second mode, the UE determines whether the band configuration is supported by the UE based at least in part on whether the band configuration is indicated by the capability information.

In some aspects, the capability information is most recent capability information transmitted by the UE.

In some aspects, the band configuration is indicated as supported by the UE via previous capability information transmitted prior to the transmission of the capability information.

In some aspects, the previous capability information is based at least in part on a first capability inquiry for information regarding band combinations and the capability information is based at least in part on a second capability inquiry for information regarding band combinations.

In some aspects, the first capability inquiry and the second capability inquiry are associated with different sets of band combinations.

In some aspects, a UE for wireless communication includes a memory; and one or more processors operatively coupled to the memory, the memory and the one or more processors configured to: transmit capability information indicating a set of band configurations; receive information indicating a band configuration, wherein the band configuration is supported by the UE and is not indicated by the capability information; and communicate using the band configuration based at least in part on the band configuration being supported by the UE.

In some aspects, the band configuration comprises a Long Term Evolution carrier aggregation configuration.

In some aspects, the band configuration comprises a multi radio access technology dual connectivity configuration.

In some aspects, the band configuration comprises a New Radio carrier aggregation configuration.

In some aspects, the band configuration indicates a multiple-input multiple-output configuration for one or more bands.

In some aspects, the band configuration indicates a modulation scheme configuration for one or more bands.

In some aspects, the band configuration relates to a group of bands.

In some aspects, the one or more processors are further configured to: determine whether the band configuration is supported by the UE; and determine whether to indicate invalid configuration based at least in part on whether the band configuration is supported by the UE.

In some aspects, the one or more processors are further configured to: determine that the band configuration is not indicated by the capability information, wherein the determination of whether the band configuration is supported by the UE is based at least in part on the determination that the band configuration is not indicated by the capability information.

In some aspects, wherein the UE is associated with a first mode and a second mode, wherein the determination of whether the band configuration is supported by the UE is irrespective of whether the band configuration is indicated by the capability information based at least in part on being in the first mode, and wherein, in the second mode, the UE determines whether the band configuration is supported by the UE based at least in part on whether the band configuration is indicated by the capability information.

In some aspects, the capability information is most recent capability information transmitted by the UE.

In some aspects, the band configuration is indicated as supported by the UE via previous capability information transmitted prior to the transmission of the capability information.

In some aspects, the previous capability information is based at least in part on a first capability inquiry for information regarding band combinations and the capability information is based at least in part on a second capability inquiry for information regarding band combinations.

In some aspects, the first capability inquiry and the second capability inquiry are associated with different sets of band combinations.

In some aspects, a non-transitory computer-readable medium storing a set of instructions for wireless communication includes one or more instructions that, when executed by one or more processors of a user equipment (UE), cause the UE to: transmit capability information indicating a set of band configurations; receive information indicating a band configuration, wherein the band configuration is supported by the UE and is not indicated by the capability information; and communicate using the band configuration based at least in part on the band configuration being supported by the UE.

In some aspects, the band configuration comprises a Long Term Evolution carrier aggregation configuration.

In some aspects, the band configuration comprises a multi radio access technology dual connectivity configuration.

In some aspects, the band configuration comprises a New Radio carrier aggregation configuration.

In some aspects, the band configuration indicates a multiple-input multiple-output configuration for one or more bands.

In some aspects, the band configuration indicates a modulation scheme configuration for one or more bands.

In some aspects, the band configuration relates to a group of bands.

In some aspects, the one or more instructions further cause the UE to: determine whether the band configuration is supported by the UE; and determine whether to indicate invalid configuration based at least in part on whether the band configuration is supported by the UE.

In some aspects, the one or more instructions further cause the UE to: determine that the band configuration is not indicated by the capability information, wherein the determination of whether the band configuration is supported by the UE is based at least in part on the determination that the band configuration is not indicated by the capability information.

In some aspects, wherein the UE is associated with a first mode and a second mode, wherein the determination of whether the band configuration is supported by the UE is irrespective of whether the band configuration is indicated by the capability information based at least in part on being in the first mode, and wherein, in the second mode, the UE determines whether the band configuration is supported by the UE based at least in part on whether the band configuration is indicated by the capability information.

In some aspects, the capability information is most recent capability information transmitted by the UE.

In some aspects, the band configuration is indicated as supported by the UE via previous capability information transmitted prior to the transmission of the capability information.

In some aspects, the previous capability information is based at least in part on a first capability inquiry for information regarding band combinations and the capability information is based at least in part on a second capability inquiry for information regarding band combinations.

In some aspects, the first capability inquiry and the second capability inquiry are associated with different sets of band combinations.

In some aspects, an apparatus for wireless communication includes means for transmitting capability information indicating a set of band configurations; means for receiving information indicating a band configuration, wherein the band configuration is supported by the apparatus and is not indicated by the capability information; and means for communicating using the band configuration based at least in part on the band configuration being supported by the apparatus.

In some aspects, the band configuration comprises a Long Term Evolution carrier aggregation configuration.

In some aspects, the band configuration comprises a multi radio access technology dual connectivity configuration.

In some aspects, the band configuration comprises a New Radio carrier aggregation configuration.

In some aspects, the band configuration indicates a multiple-input multiple-output configuration for one or more bands.

In some aspects, the band configuration indicates a modulation scheme configuration for one or more bands.

In some aspects, the band configuration relates to a group of bands.

In some aspects, the apparatus includes means for determining whether the band configuration is supported by the apparatus; and means for determining whether to indicate invalid configuration based at least in part on whether the band configuration is supported by the apparatus.

In some aspects, the apparatus includes means for determining that the band configuration is not indicated by the capability information, wherein the determination of whether the band configuration is supported by the apparatus is based at least in part on the determination that the band configuration is not indicated by the capability information.

In some aspects, the apparatus is associated with a first mode and a second mode, wherein the determination of whether the band configuration is supported by the apparatus is irrespective of whether the band configuration is indicated by the capability information based at least in part on being in the first mode, and wherein, in the second mode, the UE determines whether the band configuration is supported by the UE based at least in part on whether the band configuration is indicated by the capability information.

In some aspects, the capability information is most recent capability information transmitted by the apparatus.

In some aspects, the band configuration is indicated as supported by the apparatus via previous capability information transmitted prior to the transmission of the capability information.

In some aspects, the previous capability information is based at least in part on a first capability inquiry for information regarding band combinations and the capability information is based at least in part on a second capability inquiry for information regarding band combinations.

In some aspects, the first capability inquiry and the second capability inquiry are associated with different sets of band combinations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process associated with configuring UE-supported band configurations, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
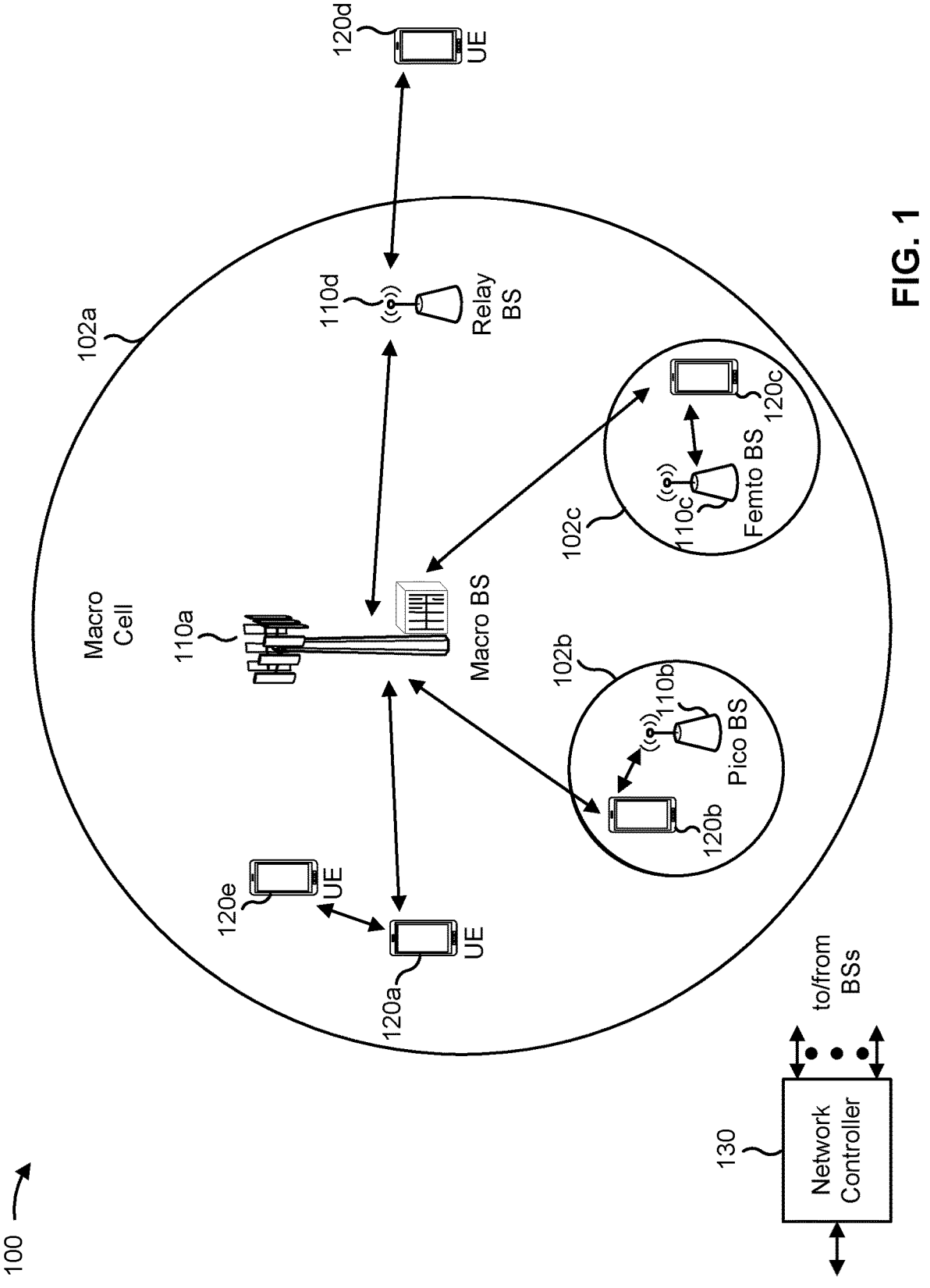
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
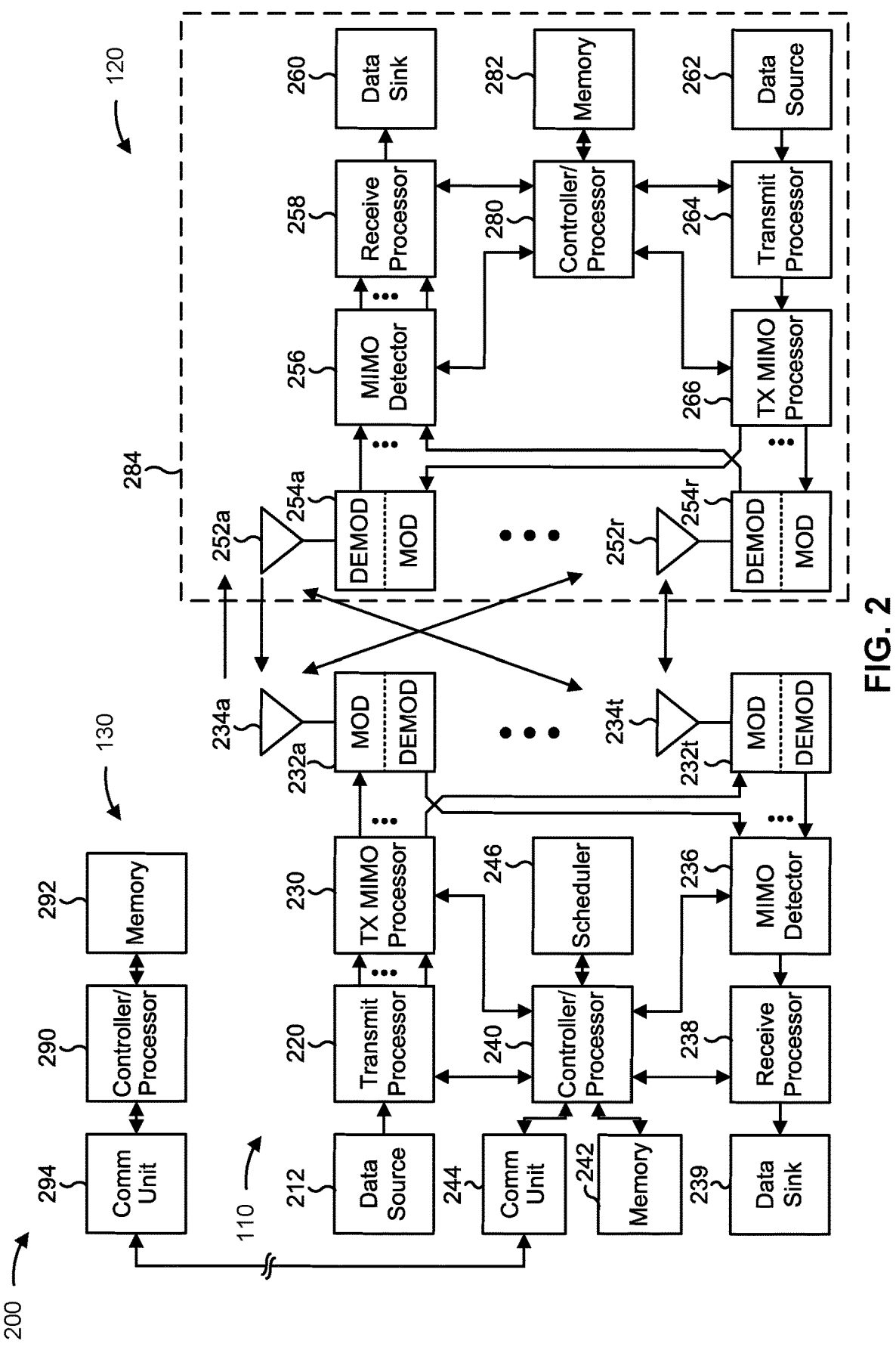
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with configuring UE-supported band combinations, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10 and/or other processes as described herein. In some aspects, executing instructions may include running the instructions, converting the instructions, compiling the instructions, and/or interpreting the instructions.

In some aspects, the UE includes means for transmitting capability information indicating a set of band configurations; means for receiving information indicating a band configuration, wherein the band configuration is supported by the UE and is not indicated by the capability information; or means for communicating using the band configuration based at least in part on the band configuration being supported by the UE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining whether the band configuration is supported by the UE; or means for determining whether to indicate invalid configuration based at least in part on whether the band configuration is supported by the UE.

In some aspects, the UE includes means for determining that the band configuration is not indicated by the capability information, wherein the determination of whether the band configuration is supported by the UE is based at least in part on the determination that the band configuration is not indicated by the capability information.

As indicated above, FIG. 2 is provided as an example. Other examples may differ from what is described with regard to FIG. 2.

Figure 3:
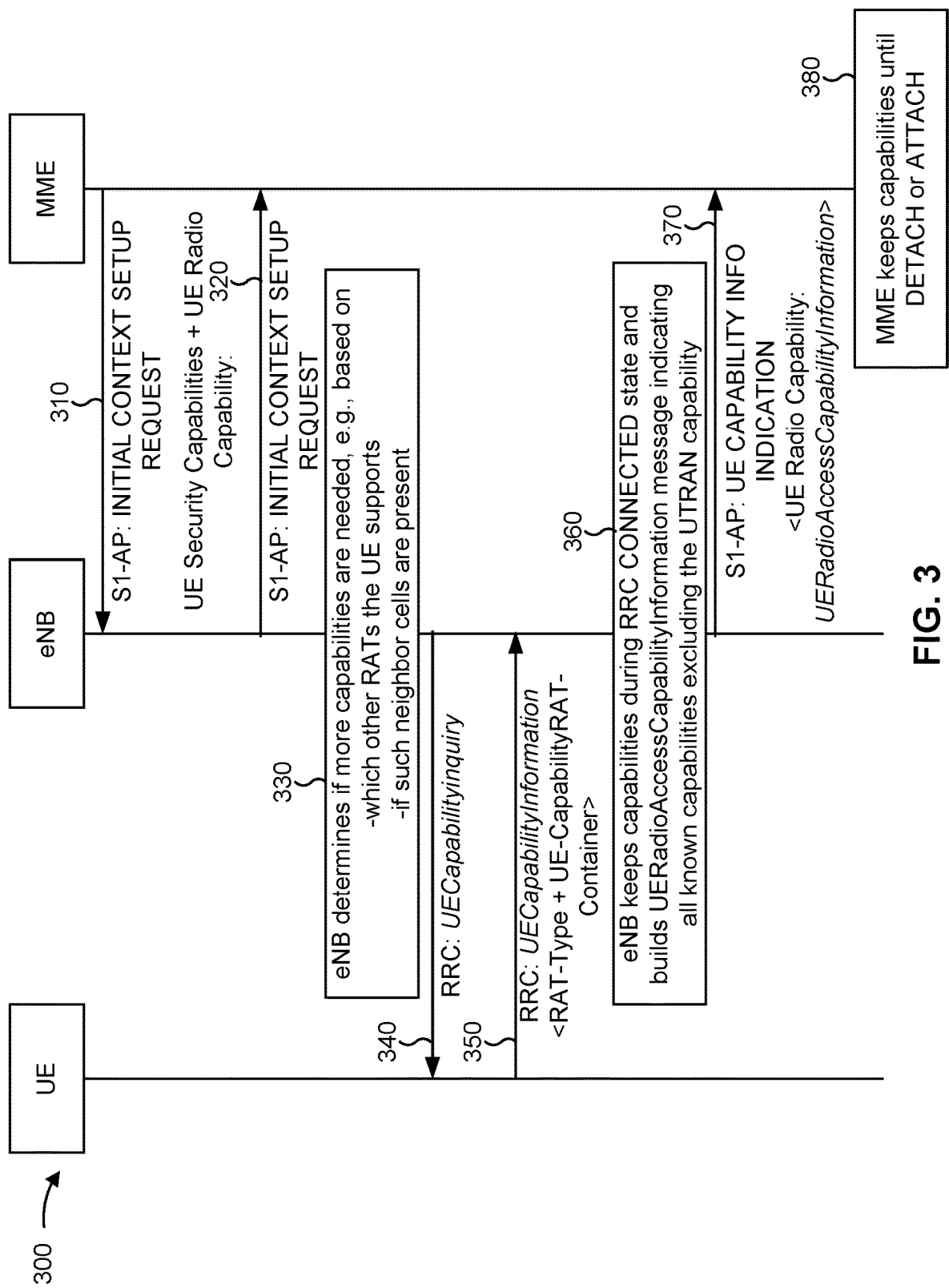
FIG. 3 is a diagram illustrating an example of UE capability signaling, in accordance with the present disclosure.

FIG. 3 is a diagram illustrating an example 300 of UE capability signaling, in accordance with various aspects of the present disclosure. As shown, example 300 includes a UE (e.g., UE 120), an eNB (e.g., BS 110), and a Mobility Management Entity (MME) (e.g., a core network device, an evolved packet core (EPC), or the like). While the eNB and the MME are typically associated with an LTE network, the operations described in example 300 can also be applied for networks using other radio access technologies (e.g., 1G, 2G, 3G, 5G/NR). For example, in the case of 5G/NR, the eNB may be a gNB and the MME may be a device or function associated with a 5G core network (5GC).

As shown by reference number 310, the MME may provide, to the BS, an initial context setup request. For example, the MME may provide the initial context setup request via an interface, such as an S1-AP interface. As further shown, the initial context setup request may indicate UE security capabilities, UE radio capabilities, or the like, such as in an information element UERadioAccessCapabilityInformation. As shown by reference number 320, the eNB may provide an initial context setup response acknowledging the initial context setup request.

As shown by reference number 330, the eNB may determine whether additional capabilities (e.g., beyond the capabilities indicated by the initial context setup request) are needed for the UE. For example, eNB may perform this determination based at least in part on which other RATs the UE supports, whether neighbor cells associated with these other RATs are present, or the like.

As shown by reference number 340, the eNB may provide a UE capability inquiry to the UE 120. The UE capability inquiry may request UE capabilities for a RAT type (e.g., 3G, LTE, 5G/NR, etc.). As shown by reference number 350, the UE may provide UE capability information (sometimes referred to herein as "capability information"). Capability information is information indicating a capability of the UE. Capability information is not necessarily exhaustive regarding capabilities of the UE. For example, in some scenarios, described elsewhere herein, the UE may be associated with capabilities in addition to those reported in the UE capability information. In some aspects, the UE capability information may include capability information for the RAT type in a UE capability RAT container. Generally, UE capability information may be transmitted in a capability container.

As shown by reference number 360, the eNB may store information indicating the UE capability information during a radio resource control (RRC) connected state of the UE. The eNB may generate a message indicating capabilities of the UE based at least in part on the UE capability information. In some aspects, the message may include a UERadioAccessCapabilityInformation message or the like. In some aspects, the message may exclude capability information associated with a particular RAT (e.g., for LTE capability information, the message may exclude UMTS Terrestrial Radio Access Network (UTRAN) capability information). As shown by reference number 370, the eNB may provide a UE capability information indication to the MME. For example, the UE capability information indication may include the UERadioAccessCapabilityInformation message. As shown by reference number 380, the MME may store the UE capability information until an event such as a detach or an attach of the UE.

The UE capabilities are considered in sync with the network (e.g., the MME or the eNB) when the UE's latest capabilities, for all RATs, match the latest capabilities reported to the network. If the UE has changed E-UTRAN radio access capabilities, the UE may transmit a TAU (tracking area update) with an indication of a UE radio capability update that results in the update of UE radio access capabilities using a new RRC connection. Out-of-sync of capability information between the UE and the network may result in invalid configurations, or signaling associated with an invalid configuration (e.g., radio link failure (RLF) signaling or the like) due to reconfiguration validation failures.

In mobility cases where source and target telecommunication nodes (such as a nodeB, an eNB, a next generation eNB (ng-eNB), or a gNB) are not able to synchronize the UE's capability information (e.g., radio capability information), the source node and the target node may have different capability information (e.g., radio capability information) of the UE, which may lead to invalid configuration due to reconfiguration validation failures because the UE and the network have different latest capability contexts. In other cases, for example, where the network does not initiate a UE capability inquiry (or does not request all required RATs in the inquiry) based at least in part on the UE's TAU with radio capability update indication, out-of-sync of capability information between the UE and the network may occur due to capability mismatch. Examples of out-of-sync capability information causing invalid configuration are described in more detail in connection with FIGS. 4-6, below. Techniques and apparatuses described herein mitigate out-of-sync access stratum (AS) capabilities between the UE and the network, thereby reducing the likelihood of invalid configuration upon band configuration by the network.

In some cases, the out-of-sync capabilities can occur for intra-LTE or inter-RAT mobility, where the network configures the UE with an LTE carrier aggregation, multi-RAT dual connectivity (MRDC), NR CA, or NR DC band combination that was not advertised in the latest capability information transmitted by the UE, but was in previous capability information (leading to a capability information mismatch between the source network and the target network). Such LTE CA or MRDC/NR CA/NR DC configuration leads to invalid configuration or RLF by UE, impacting call quality, call drop rates, and user experience. Techniques and apparatuses described herein may avoid invalid configurations upon receiving an LTE CA or MRDC/NR CA/NR DC configuration transmitted by the network, such as in scenarios where the network unintentionally configures an LTE CA or MRDC/NR CA/NR DC combination that is not advertised by UE during a latest capability exchange. It should be noted that the techniques and apparatuses described herein can also be applied for various other forms of band configuration, as described in more detail elsewhere herein.

Some techniques and apparatuses described herein relate to carrier aggregation (CA). CA provides a way for a UE to communicate using more than one carrier frequency. CA may be used by a UE and a network in order to increase the bandwidth, and thereby increase the bitrate of the network. To achieve CA, one or more secondary component carriers (SCCs) are added, modified, or removed by the network, while a primary component carrier (PCC) is generally only changed at handover. Signaling associated with CA may occur via the PCC. The PCC may be considered the main carrier in any group. The PCC may include a primary downlink carrier and an associated uplink primary component carrier. A parameter such as SCellToAddModList or SCellToAddModListExt may indicate an SCC to be added, modified, or removed. The UE may report capability information indicating what kind of CA can be configured for the UE, such as particular band combinations supported by the UE. A band combination is a group of two or more bands on which component carriers can be configured. For example, E-UTRAN may initiate the UE capability transfer procedure described with regard to FIG. 3 in an RRC_CONNECTED state. Some wireless communication specifications may impose a limit on the number of band combinations that can be reported by the UE. Examples of limits on the number of band combinations include 128 band combinations, 256 band combinations, or 384 band combinations. In some cases, a band combination may be referred to herein as a band configuration. The number of band combinations to be reported by the UE may be indicated by a capability inquiry. The number of band combinations that are supported by the UE is likely to exceed the number of band combinations reported in UE capability information. For example, some UEs can support more than 5500 LTE standalone CA band combos from a radio frequency (RF) and RRC perspective.

As indicated above, FIG. 3 is provided as an example. Other examples may differ from what is provided with regard to FIG. 3.

Figure 4:
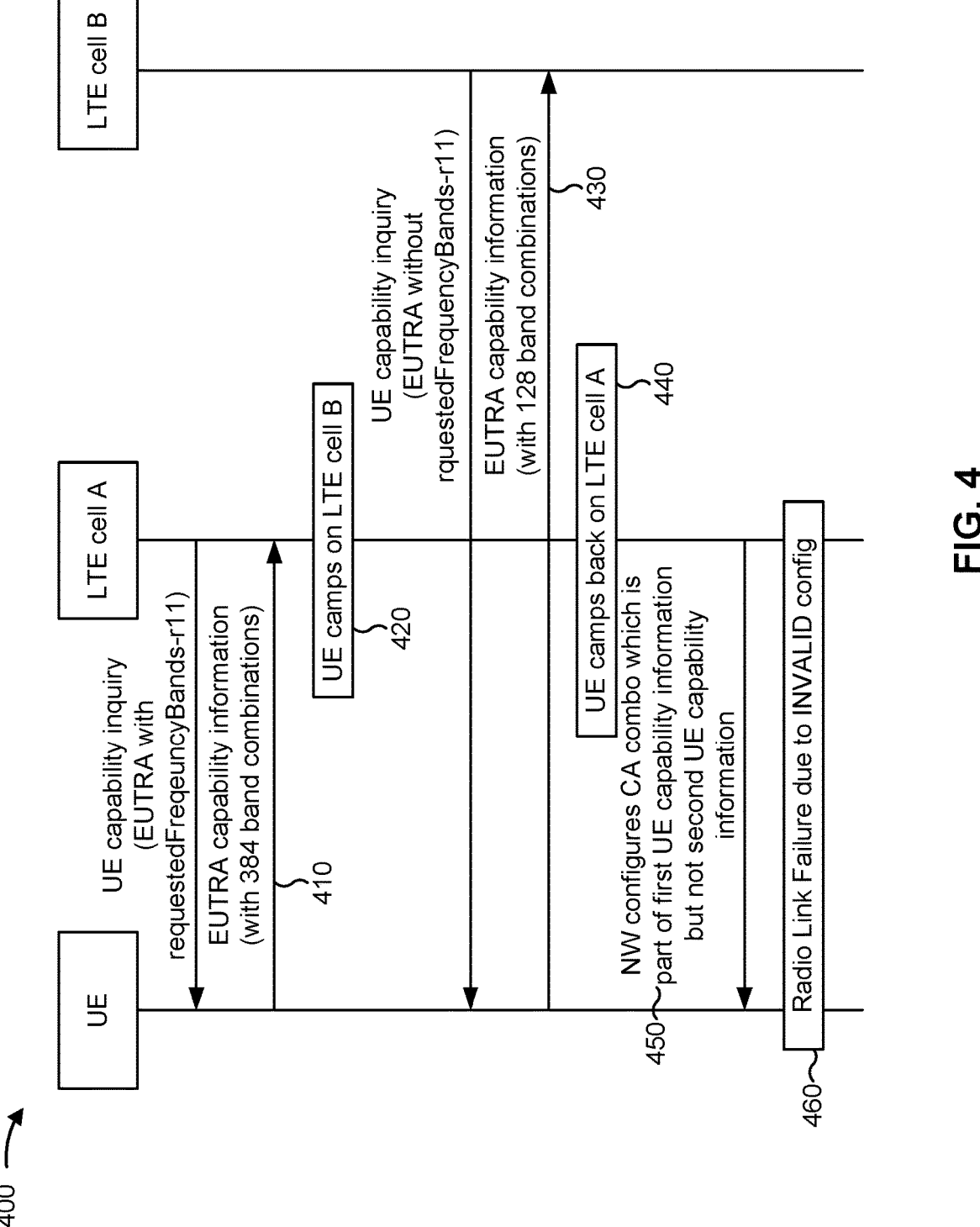
FIGS. 4-6 are diagrams illustrating examples associated with configuration of a band configuration that is outside of a UE's signaled capabilities, in accordance with the present disclosure.
Figure 5:
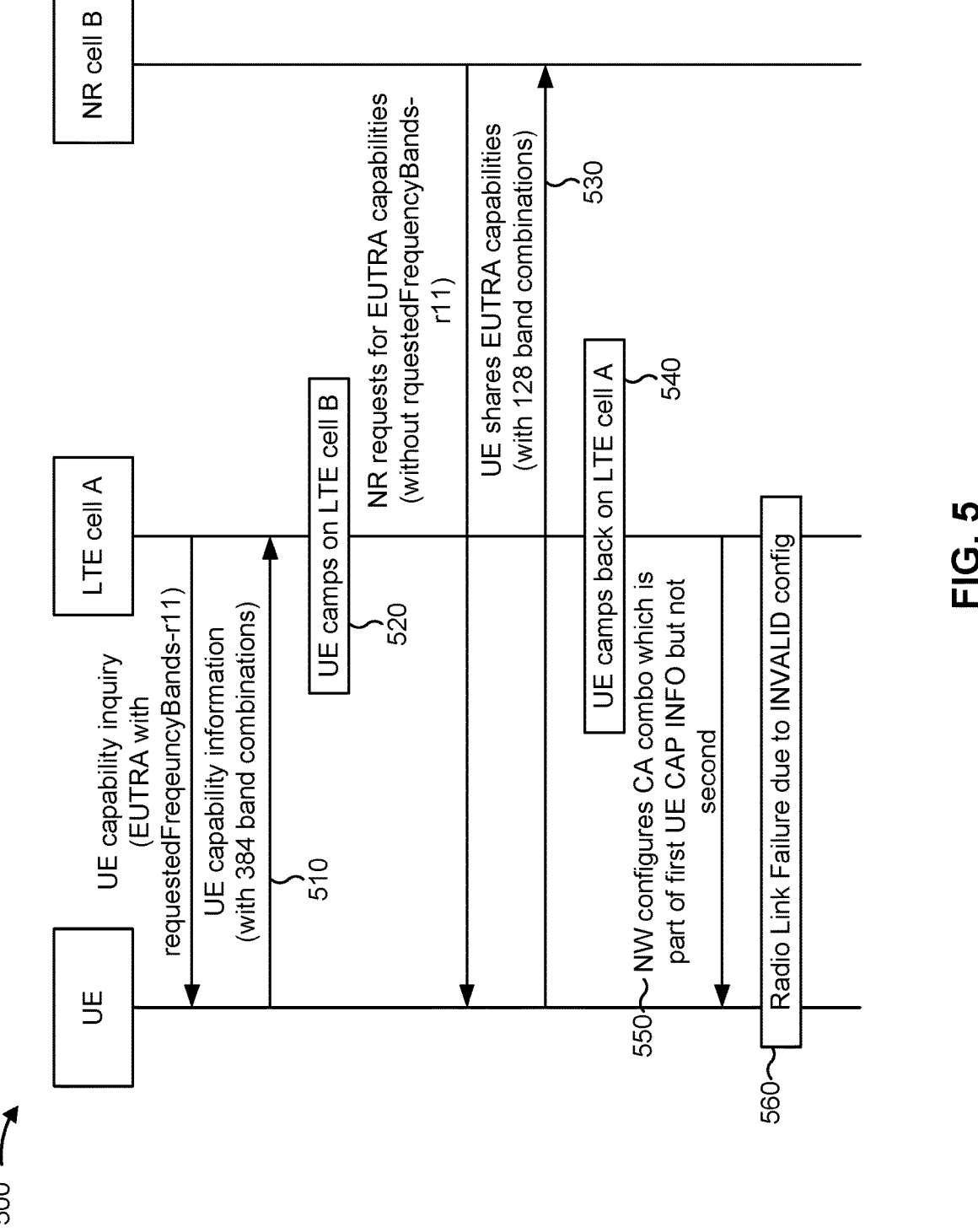
Figure 6:
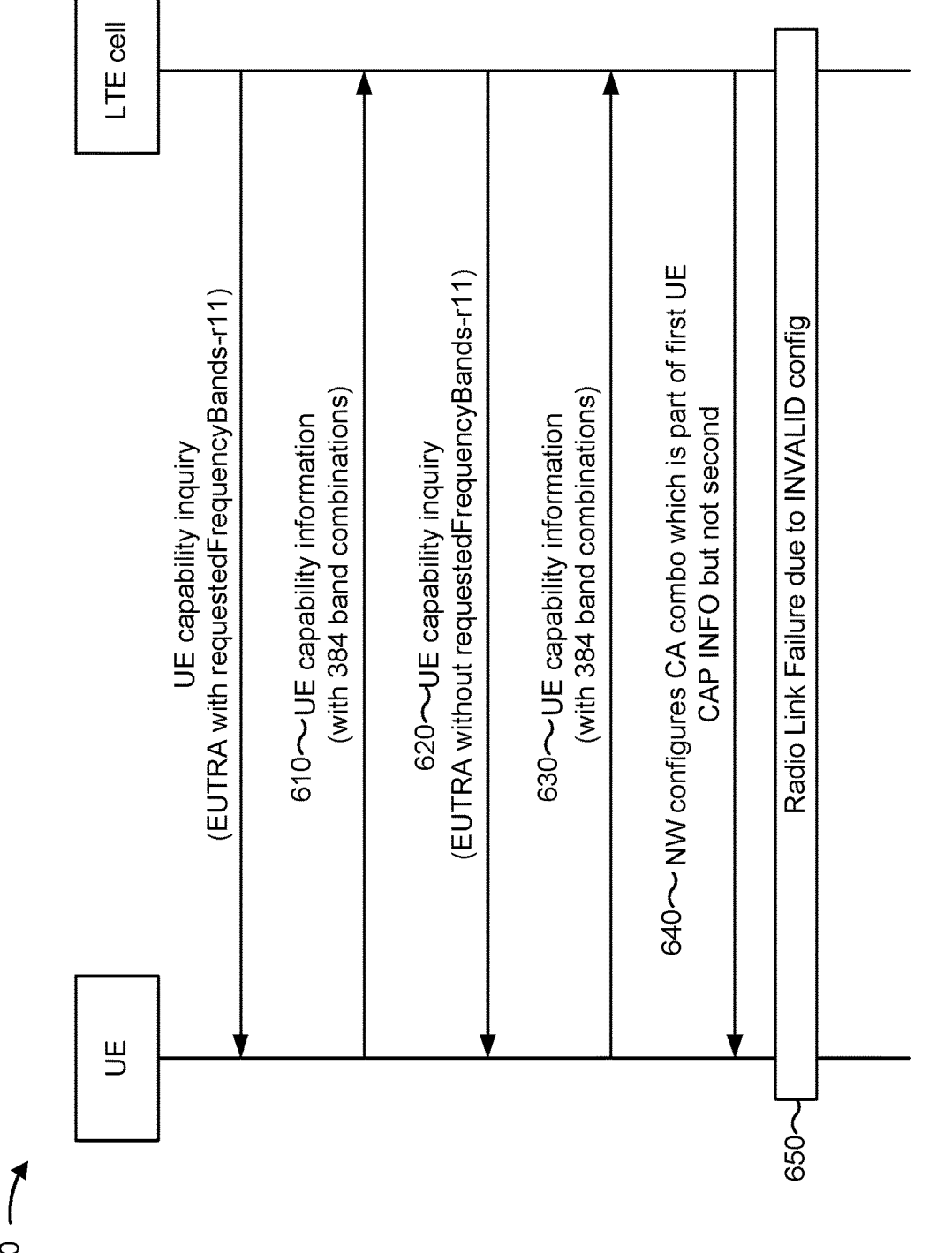

FIGS. 4-6 are diagrams illustrating examples 400, 500, and 600 associated with configuration of a band configuration that is outside of a UE's signaled capabilities. FIGS. 4-6 show how invalid configuration can occur due to a UE's usage of a most-recently signaled capability information to determine whether a band configuration signaled by a network is within the UE's capabilities.

FIG. 4 shows an example 400 relating to intra-RAT mobility. Specifically, FIG. 4 relates to intra-LTE mobility, but the operations described with regard to FIG. 4 can be applied for any intra-RAT mobility. As shown, FIG. 4 includes an LTE cell A and an LTE cell B. LTE cell A and LTE cell B can be provided by the same base station (e.g., the same eNB) or by different base stations (e.g., different eNBs). In FIG. 4, the UE is initially camped on LTE cell A. As shown by reference number 410, the UE may transmit an Evolved Universal Mobile Telecommunications System (UMTS) Terrestrial Radio Access (EUTRA) capability container that indicates 384 band combinations based at least in part on a capability inquiry received from camped LTE cell A. In some aspects, the capability container may indicate the 384 band combinations based at least in part on the capability information requesting 384 band combinations. As shown by reference number 420, the UE may reselect to LTE cell B, and LTE cell B may also perform a capability inquiry that is different from the capability inquiry of LTE cell A. For example, in some cases, capability information present with LTE cell A cannot be transferred to LTE cell B, for example, because LTE cell B cannot accept a size of capabilities being provided by LTE cell A.

As shown by reference number 430, the UE may transmit an AS capability container that indicates 128 bands combinations. As shown by reference number 440, the UE may camp on LTE cell A again. As shown by reference number 450, LTE cell A may configure a band configuration (e.g., a band combination such as a CA combination) that is indicated by the first capability information (with the 384 band combinations) and not the second capability information (with the 128 band combinations). However, the UE may use a most recently transmitted capability information to determine whether the configured band configuration is within the UE's capabilities. Since the configured band combination is not indicated by the second capability information, the UE may determine that the UE is out-of-sync, and the UE may therefore declare invalid configuration (e.g., RLF) (as shown by reference number 460), which degrades network performance, reduces throughput, and impacts user experience.

As a more particular example, a UE may camp on LTE cell A and the network (NW) may perform an EUTRA capability inquiry with requestedFrequencyBands-r11. The UE may achieve DL CAT 20 by advertising up to 5DLCA band combinations. The NW may perform a handover to LTE cell B. The NW may perform a new capability enquiry without requestedFrequencyBands-r11 on LTE cell B. As per a wireless communication standard such as 3GPP Technical Specification 36.331, the UE may clear the previously advertised EUTRA capability container, and may provide another set of 128 CA combinations in an EUTRA container based at least in part on the capability inquiry from LTE cell B. The UE may achieve DL CAT 19 by advertising up to 4DLCA band combos. The NW may configure a CA band combination which was advertised in the first capability information but not the second capability information. Thus, the UE may trigger RLF since the CA combo configured by the LTE cell A was not advertised in the second capability information.

FIG. 5 shows an example 500 relating to inter-RAT mobility. Specifically, FIG. 5 relates to mobility from an LTE cell A to an NR cell B, but the operations described with regard to FIG. 5 can be applied for any intra-RAT mobility. As shown, FIG. 5 includes an LTE cell A and an NR cell B. LTE cell A and NR cell B can be provided by the same base station or by different base stations. In FIG. 5, the UE is initially camped on LTE cell A. As shown by reference number 510, the UE may transmit an EUTRA capability container that indicates 384 band combinations based at least in part on a capability inquiry received from camped LTE cell A. In some aspects, the capability container may indicate the 384 band combinations based at least in part on the capability information requesting 384 band combinations. As shown by reference number 520, the UE may move to NR cell B, and NR cell B may also perform a capability inquiry that is different from the capability inquiry of LTE cell A. For example, in some cases, capability information present with LTE cell A cannot be transferred to NR cell B.

As shown by reference number 530, the UE may transmit an EUTRA capability container that indicates 128 band combinations. As shown by reference number 540, the UE may camp on LTE cell A again. As shown by reference number 550, LTE cell A may configure a band configuration (e.g., a band combination such as a CA combination) that is indicated by the first capability information (with the 384 band combinations) and not the second capability information (with the 128 band combination). However, the UE may use a most recently transmitted capability information to determine whether the configured band configuration is within the UE's capabilities. Since the configured band combination is not indicated by the second capability information, the UE may determine that the UE is out-of-sync, and the UE may therefore declare invalid configuration (e.g., RLF) (as shown by reference number 560), which degrades network performance, reduces throughput, and impacts user experience.

FIG. 6 shows an example 600 relating to a single cell. As shown, FIG. 6 includes an LTE cell, though the operations of example 600 apply to any RAT. As shown by reference number 610, the UE may transmit an EUTRA capability container that indicates 384 band combinations based at least in part on a first capability inquiry received from the LTE cell. In some aspects, the capability container may indicate the 384 band combinations based at least in part on the first capability inquiry requesting 384 band combinations. As shown by reference number 620, the UE may receive, from the LTE cell, a second capability inquiry that is different from the first capability inquiry. As shown by reference number 630, the UE may transmit an EUTRA capability container that indicates 128 band combinations. As shown by reference number 640, the LTE cell may configure a band configuration (e.g., a band combination such as a CA combination) that is indicated by the first capability information (with the 384 band combinations) and not the second capability information (with the 128 band combinations). However, the UE may use a most recently transmitted capability information to determine whether the configured band configuration is within the UE's capabilities. Since the configured band combination is not indicated by the second capability information, the UE may determine that the UE is out-of-sync, and the UE may therefore declare invalid configuration (e.g., RLF) (as shown by reference number 650), which degrades network performance, reduces throughput, and impacts user experience.

As indicated above, FIGS. 3-6 are provided as examples. Other examples may differ from what is described with regard to FIGS. 3-6.

As described above, a UE may trigger invalid configuration when LTE CA, MRDC, NR DC, or NR CA, as configured by the network, is not part of the latest capability container exchanged by the UE with the network. For example, the NW may or may not be aware of the UE's latest capabilities of all RATs. Invalid configurations, and the RLF associated with invalid configurations, negatively impact call quality, call drop rates, and user experience, and may lead to repeated invalid configurations and cell barring. These issues can also arise for non-CA-based band configurations, as described elsewhere herein. Another situation leading to an out-of-sync status between a UE's capability reporting and a network's stored capability information can include a UE updating AS capabilities of a RAT (container) and sending a TAU request with radio capability update to the NW, then waiting for the NW to request for the UE's capability to be in sync. In cases where the NW does not perform a UE capability inquiry, an out-of-sync state between the UE and the NW can occur. Furthermore, during mobility, a lack of capability information at the target eNB by MME (if capability information is present at MME), or a lack of capability information at the MME (if the eNB fails to transfer the received capability information to MME), can cause an out-of-sync status. Still other issues can be caused by different release versions of an eNB, a failure to upgrade an eNB to support updated information elements of a capability container, a network configuration error (e.g., UE capabilities are in sync with the NW but due to NW error, the NW configures an LTE CA or MRDC/NR CA/NR DC band combination which is not part of the advertised capabilities) or the like.

Another issue can arise due to a UE capability being out-of-sync due to the introduction of E-UTRA-NR dual connectivity (ENDC) or NR DC. For example, the UE may camp on LTE cell A, and the NW may perform a EUTRA capability inquiry with requestedFrequencyBands-r11. The NW may initiate handover in connected mode to an NR-capable LTE cell B. Having camped on NR capable LTE cell B, the NW may perform another capability inquiry with requestedFreqBandsNR-MRDC-r15, but not requestedFrequencyBands-r11, to request the UE's MRDC capabilities. The UE may thus clear a first EU IRA capability container, and the UE may provide another set of CA combinations in EUTRA container based on capability inquiry. The NW may configure an SCC (e.g., a secondary cell (SCell)) which is not part of the second capability information. Thus, the UE may trigger invalid configuration (e.g., RLF) since the configured CA combination was not advertised in the most recent capability container.

Some techniques and apparatuses described herein enable determination of whether a band combination conforms with a UE's capabilities irrespective of whether the band combination is indicated by most recent capability information transmitted by the UE. For example, the UE may accept (e.g., communicate based at least in part on) any band configuration supported by the UE, even if the band combination is not indicated by capability information transmitted by the UE. For example, the UE may accept all LTE CA or MRDC or NR CA configurations supported by UE, even if not part of the latest capability information transmitted by the UE. These techniques and apparatuses described herein can be applied for any CA combination (e.g., including LTE standalone mode (SA), MRDC band combinations, NR band combinations, or the like). For example, the UE may not be limited to advertised CA combinations with regard to accepting MRDC, NR CA, or NR DC configurations by the NW.

In some aspects, the acceptance of, and/or communication based at least in part on, any band configuration supported by the UE may be based at least in part on the UE being in a relaxed mode, wherein the relaxed mode is a mode in which the UE determines whether the band configuration conforms with the UE's capabilities irrespective of whether the band configuration is indicated by most recent capability information transmitted by the UE. The relaxed mode can be contrasted with another mode in which the UE determines whether the band configuration conforms with the UE's capabilities based at least in part on whether the band configuration is indicated by most recent capability information transmitted by the UE. In some aspects, the UE may always be in the relaxed mode. For example, the UE may never trigger invalid configurations to the NW for an LTE CA, MRDC, NR DC, or NR CA configuration by the NW if the resulting configured CA band combination is supported by the UE. This also applies to scenarios where UE capabilities of all RATs are already in sync with the NW.

Some techniques and apparatuses described herein may modify reporting of UE capabilities (e.g., associated with band configurations) based at least in part on a current configured band configuration of the UE. For example, a network may query a UE's capabilities (e.g., via a capability inquiry). The UE may report a currently configured band configuration of the UE in a first position or within a first N positions (where N is an integer) of a UE capability information message. Thus, the UE ensures that the currently configured band configuration is signaled to the base station, even if the UE's capability information message has insufficient positions for all of a UE's band configurations.

Figure 7:
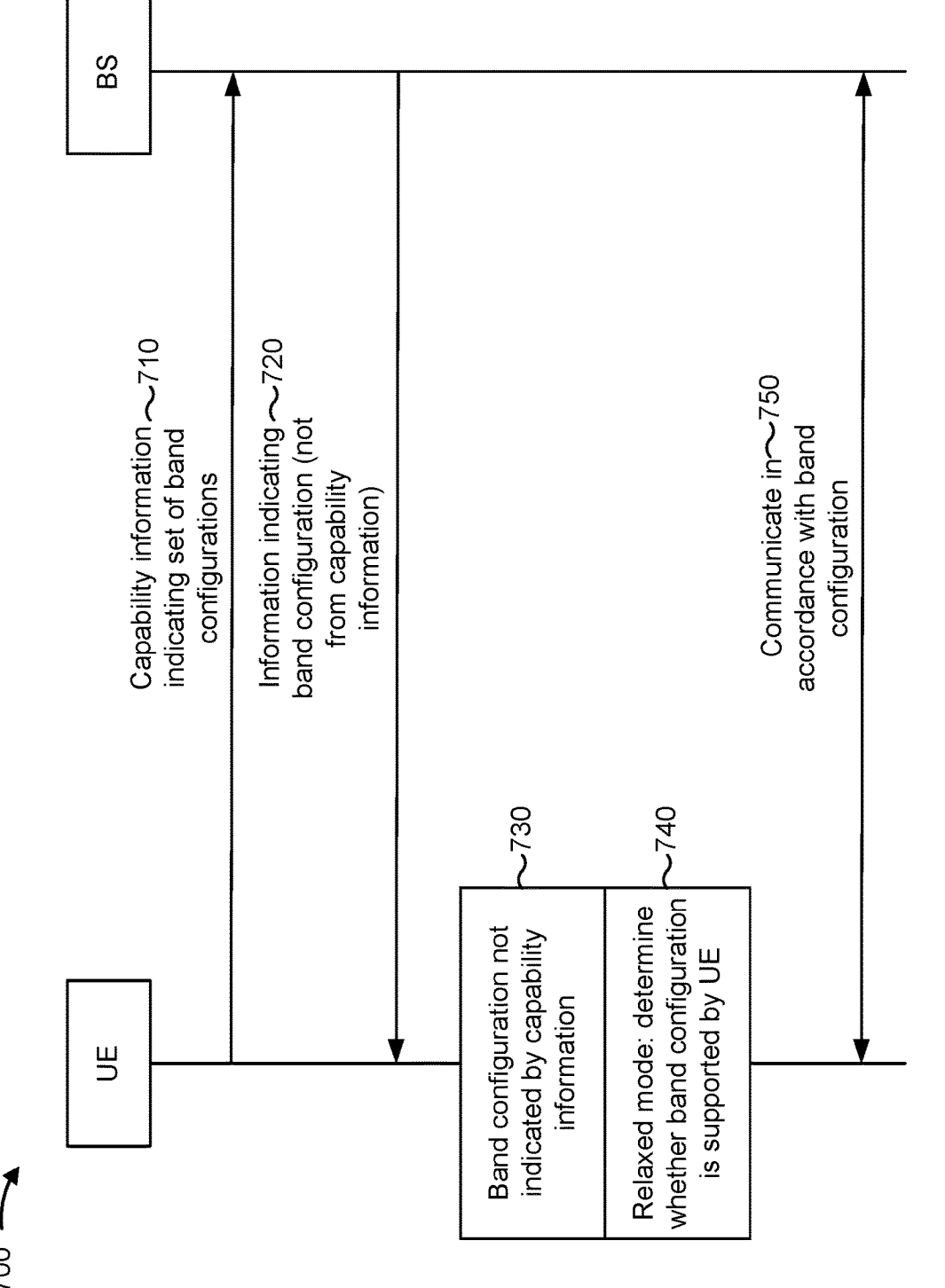
FIGS. 7-9 are diagrams illustrating examples of implementation of a band configuration that is within a UE's supported capabilities and outside of the UE's signaled capabilities, in accordance with the present disclosure.

FIG. 7 is a diagram illustrating an example 700 of implementation of a band configuration that is within a UE's supported capabilities and outside of the UE's signaled capabilities, in accordance with various aspects of the present disclosure. For example, FIG. 7 shows signaling associated with the implementation of the band combination. As shown, FIG. 7 includes a UE (e.g., UE 120) and a BS (e.g., BS 110). The BS 110 may provide one or more cells associated with one or more RATs.

As shown by reference number 710, the UE may transmit capability information to the BS. In some aspects, the UE may transmit the capability information based at least in part on a capability inquiry from the BS, as described in more detail elsewhere herein. In some aspects, the UE may transmit the capability information via RRC signaling or the like.

As shown, the capability information may indicate a set of band configurations supported by the UE. A band configuration includes any information regarding a capability associated with a band that can be conveyed via capability information. In some aspects, the band configuration may indicate a set of band combinations (e.g., CA configurations) supported by the UE (e.g., associated with LTE CA, MRDC, NR DC, NR CA, or the like). In some aspects, the band configuration may indicate a baseband configuration for a carrier or a band. For example, the band configuration may indicate a MIMO configuration for one or more bands (e.g., a 4-layer (4L) MIMO configuration, a full duplex MIMO (FD-MIMO) configuration, a rank associated with a MIMO configuration, or the like). As another example, the band configuration may indicate a modulation scheme, such as UL256QAM, DL256QAM, or DL1024QAM. In some aspects, the band configuration may indicate a non-CA configuration, such as a single-band capability. For example, the band configuration may indicate a number of layers supported for a band. In some aspects, the band configuration may indicate another form of configuration, whether or not associated with a band. Some techniques and apparatuses described herein can be applied for any UE-supported feature, whether or not the feature is associated with a band combination or a band configuration.

As shown by reference number 720, the BS may transmit information indicating a band configuration. For example, the BS may configure a band configuration for the UE. In some aspects, the band configuration may include a band configuration that is not indicated by the capability information. For example, the band configuration may be selected from a set of band configurations indicated by previous capability information. As another example, the band configuration may be determined using the capability information as an input, for example, based at least in part on signaled capabilities of the UE. The band configuration signaled by the BS can include any form of band configuration, such as a band combination, a baseband band configuration, a non-CA band configuration, or the like.

As shown by reference number 730, the UE may determine that the band configuration is not indicated by the capability information shown by reference number 710. For example, the UE may determine that the band configuration, signaled by the BS, is not identified by most recent (e.g., latest) capability information transmitted by the UE. This can be for a variety of reasons, described in more detail elsewhere herein. In some aspects, the UE may not perform such a determination. For example, the UE may proceed to the operation shown by reference number 740 without determining whether the band configuration is indicated by the capability information, which conserves processing resources.

As shown by reference number 740, the UE may determine whether the band configuration, signaled by the BS, is supported by the UE. For example, the UE may determine whether the band configuration is supported by the UE irrespective of whether the band configuration is indicated in the capability information shown by reference number 710 (e.g., the most recently transmitted capability information). In some aspects, the UE may perform this determination based at least in part on being in a mode referred to herein as a relaxed mode, as described elsewhere herein.

As shown by reference number 750, the UE may communicate in accordance with the band configuration. In some aspects, the UE may accept the band configuration. In some aspects, the UE may transmit or receive a communication based at least in part on the band configuration. In some aspects, the UE may implement and/or use a CA configuration or a baseband band configuration indicated by the band configuration. In some aspects, the UE may communicate via one or more carriers indicated by the band configuration. In some aspects, if a carrier in a CA combination is advertised with a two layer (2L) MIMO capability and the NW (due to out of sync or incorrect config) configures the UE with a 4L MIMO capability, the UE may accept the configuration if it is supported by the UE. In some aspects, if a single band capability is advertised with 2L capability, and the NW configures the UE with 4L capability, the UE may accept the configuration if the configured band is capable of supporting 4L.

Thus, the UE may determine whether the band configuration is valid for the UE based at least in part on a capability of the UE (e.g., irrespective of a most recent capability information signaled by the UE, or after determining that the band configuration is not identified by the most recent capability information), which increases the versatility of the UE, reduces the likelihood of invalid configuration, increases throughput, reduces call drops, improves call quality, improves the rate of handover success and improves reliability.

As indicated above, FIG. 7 is provided as an example. Other examples may differ from what is described with regard to FIG. 7.

Figure 8:
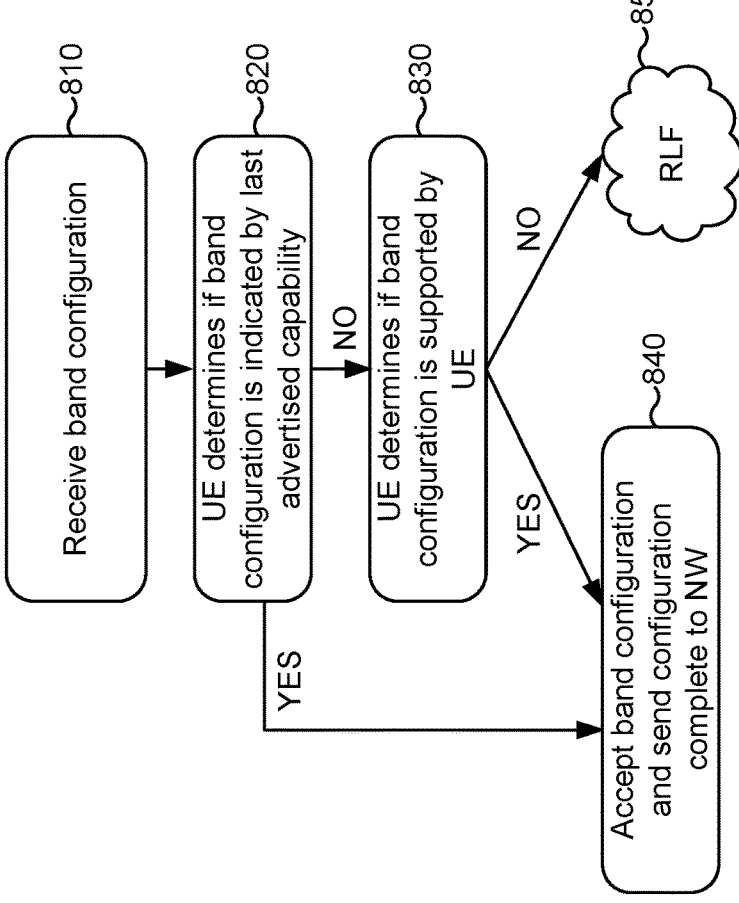

FIG. 8 is a diagram illustrating an example 800 of implementation of a band configuration that is within a UE's supported capabilities and outside of the UE's signaled capabilities, in accordance with various aspects of the present disclosure.

As shown by reference number 810, the UE may receive a band configuration from a NW (e.g., a BS 110). As shown by block 820, the UE may determine whether the band configuration is indicated by a last advertised capability (e.g., most recently transmitted capability information). If the band configuration is indicated by the last advertised capability information (block 820—YES), then the UE may accept the band configuration, and may transmit a configuration complete message to the NW (e.g., if the configuration is successful) (block 840). If the band configuration is not indicated by the last advertised capability (block 820—NO), then the UE may determine whether the band configuration is supported by the UE (block 830). If the band configuration is successful (block 830—YES), then the UE may proceed to block 840. If the band configuration is unsuccessful, then the UE may declare invalid configuration (block 850).

As indicated above, FIG. 8 is provided as an example. Other examples may differ from what is described with regard to FIG. 8.

Figure 9:
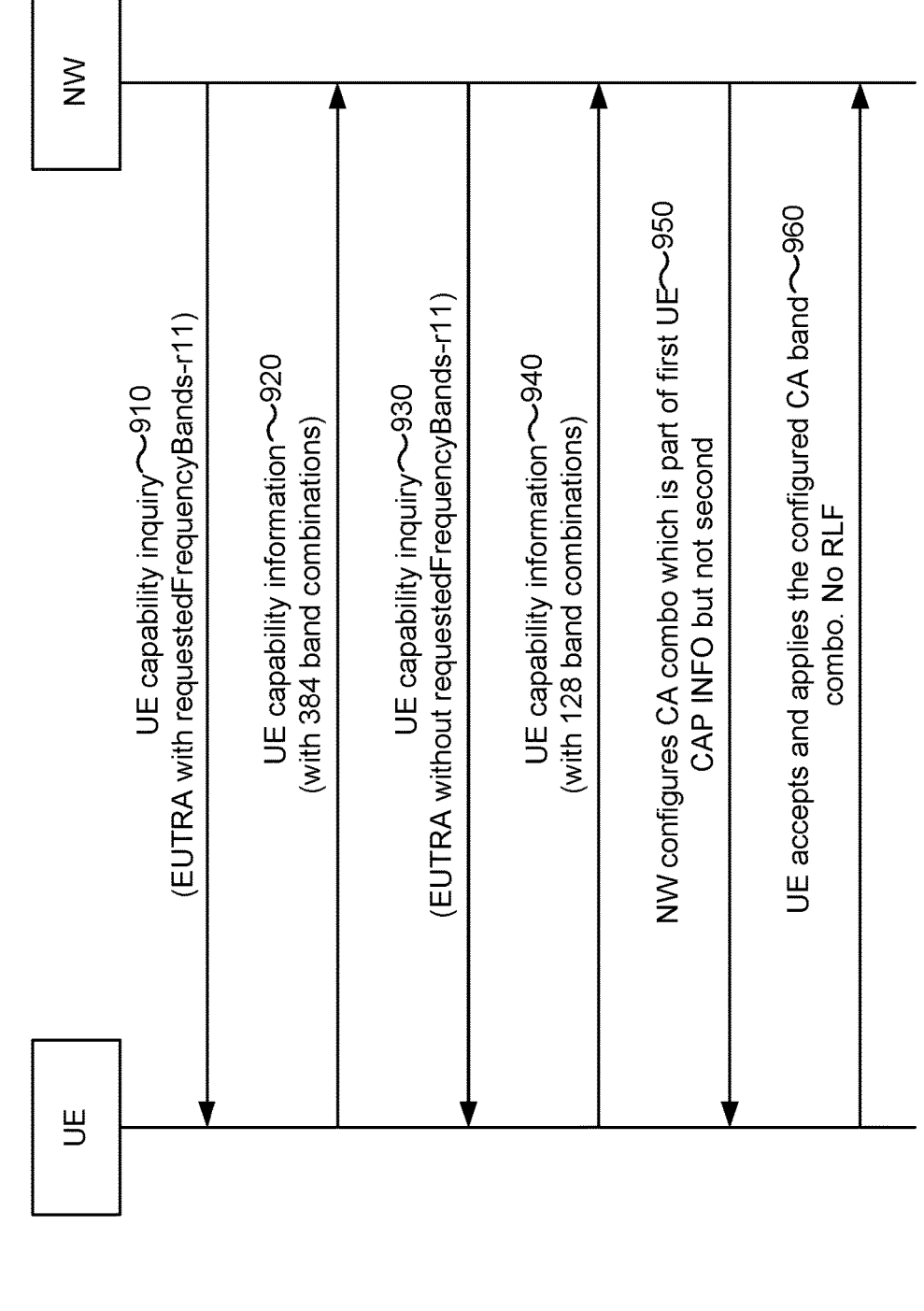

FIG. 9 is a diagram illustrating an example 900 of implementation of a band configuration that is within a UE's supported capabilities and outside of the UE's signaled capabilities, in accordance with various aspects of the present disclosure. FIG. 9 relates to configuration of a CA combination that is outside of a UE's most recently indicated capability information.

As shown by reference number 910, the UE may receive, from a NW (e.g., BS 110, a core network device, or the like), a first UE capability inquiry. As shown by reference number 920, the UE may provide UE capability information based at least in part on the first UE capability inquiry. For example, the UE capability information may indicate 384 band combinations in accordance with the first UE capability inquiry.

As shown by reference number 930, the UE may receive a second UE capability inquiry. As shown by reference number 940, the UE may provide UE capability information based at least in part on the second UE capability inquiry. For example, the UE capability information may indicate 128 band combinations in accordance with the second UE capability inquiry.

As shown by reference number 950, the NW may configure a CA combination for the UE. The CA combination may be indicated by the first UE capability information and not the second UE capability information. This can occur for a variety of reasons, described in more detail elsewhere herein.

As shown by reference number 960, the UE may accept the CA combination, and may apply the configured CA combination without declaring invalid configuration. For example, the UE may perform operations described with regard to FIGS. 7 and 8 to determine that the configured CA combination is within the UE's capabilities (e.g., supported by the UE) irrespective of whether the configured CA combination is indicated by the UE capability information shown by reference number 940. Thus, the UE may communicate based at least in part on the configured CA combination.

As indicated above, FIG. 9 is provided as an example. Other examples may differ from what is described with regard to FIG. 9.

FIG. 10 is a diagram illustrating an example process 1000 performed, for example, by a UE, in accordance with various aspects of the present disclosure. Example process 1000 is an example where the UE (e.g., UE 120) performs operations associated with techniques for configuring UE-supported carrier aggregation band combinations.

As shown in FIG. 10, in some aspects, process 1000 may include transmitting first capability information indicating a first set of band configurations (block 1010). For example, the UE (e.g., using transmission component 1104, depicted in FIG. 11) may transmit first capability information indicating a first set of band configurations, as described above.

As shown in FIG. 10, in some aspects, process 1000 may include transmitting second capability information indicating a second set of band configurations (block 1020). For example, the UE (e.g., using transmission component 1104, depicted in FIG. 11) may transmit second capability information indicating a second set of band configurations, as described above. The UE may transmit the second capability information after transmission of the first capability information.

As further shown in FIG. 10, in some aspects, process 1000 may include receiving information indicating a band configuration, wherein the band configuration is not included in at least one of the first set of band configurations or the second set of band configurations (block 1030). For example, the UE (e.g., using reception component 1102, depicted in FIG. 11) may receive information indicating a band configuration, wherein the band configuration is not included in at least one of the first set of band configurations or the second set of band configurations, as described above.

As further shown in FIG. 10, in some aspects, process 1000 may include communicating using the band configuration (block 1040). For example, the UE (e.g., using transmission component 1104 or reception component 1102, depicted in FIG. 11) may communicate using the band configuration, as described above.

Process 1000 may include additional aspects, such as any single aspect or any combination of aspects described below and/or in connection with one or more other processes described elsewhere herein.

In a first aspect, the band configuration comprises a Long Term Evolution carrier aggregation configuration.

In a second aspect, alone or in combination with the first aspect, the band configuration comprises a multi radio access technology dual connectivity configuration.

In a third aspect, alone or in combination with one or more of the first and second aspects, the band configuration comprises a New Radio carrier aggregation configuration.

In a fourth aspect, alone or in combination with one or more of the first through third aspects, the band configuration indicates a multiple-input multiple-output configuration for one or more bands.

In a fifth aspect, alone or in combination with one or more of the first through fourth aspects, the band configuration indicates a modulation scheme configuration for one or more bands.

In a sixth aspect, alone or in combination with one or more of the first through fifth aspects, the band configuration relates to a group of bands.

In a seventh aspect, alone or in combination with one or more of the first through sixth aspects, process 1000 includes determining whether the band configuration is supported by the UE. In some aspects, the seventh aspect includes determining whether to indicate invalid configuration based at least in part on whether the band configuration is supported by the UE.

In an eighth aspect, alone or in combination with one or more of the first through seventh aspects, process 1000 includes determining that the band configuration is not indicated by the second capability information, wherein the determination of whether the band configuration is supported by the UE is based at least in part on the determination that the band configuration is not indicated by the second capability information.

In a ninth aspect, alone or in combination with one or more of the first through eighth aspects, the UE is associated with a first mode and a second mode, wherein, in the first mode, the determination of whether the band configuration is supported by the UE is irrespective of whether the band configuration is indicated by the second capability information, and wherein, in the second mode, the determination of whether the band configuration is supported by the UE is based at least in part on whether the band configuration is indicated by the second capability information.

In a tenth aspect, alone or in combination with one or more of the first through ninth aspects, the second capability information is most recent capability information transmitted by the UE.

In an eleventh aspect, alone or in combination with one or more of the first through tenth aspects, the band configuration is indicated as supported by the UE via previous capability information transmitted prior to the transmission of the capability information.

In a twelfth aspect, alone or in combination with one or more of the first through eleventh aspects, the first capability information is based at least in part on a first capability inquiry for information regarding band combinations and the second capability information is based at least in part on a second capability inquiry for information regarding band combinations.

In a thirteenth aspect, alone or in combination with one or more of the first through twelfth aspects, the first capability inquiry and the second capability inquiry are associated with different sets of band combinations.

In a fourteenth aspect, alone or in combination with one or more of the first through thirteenth aspects, the band configuration comprises a New Radio dual connectivity configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
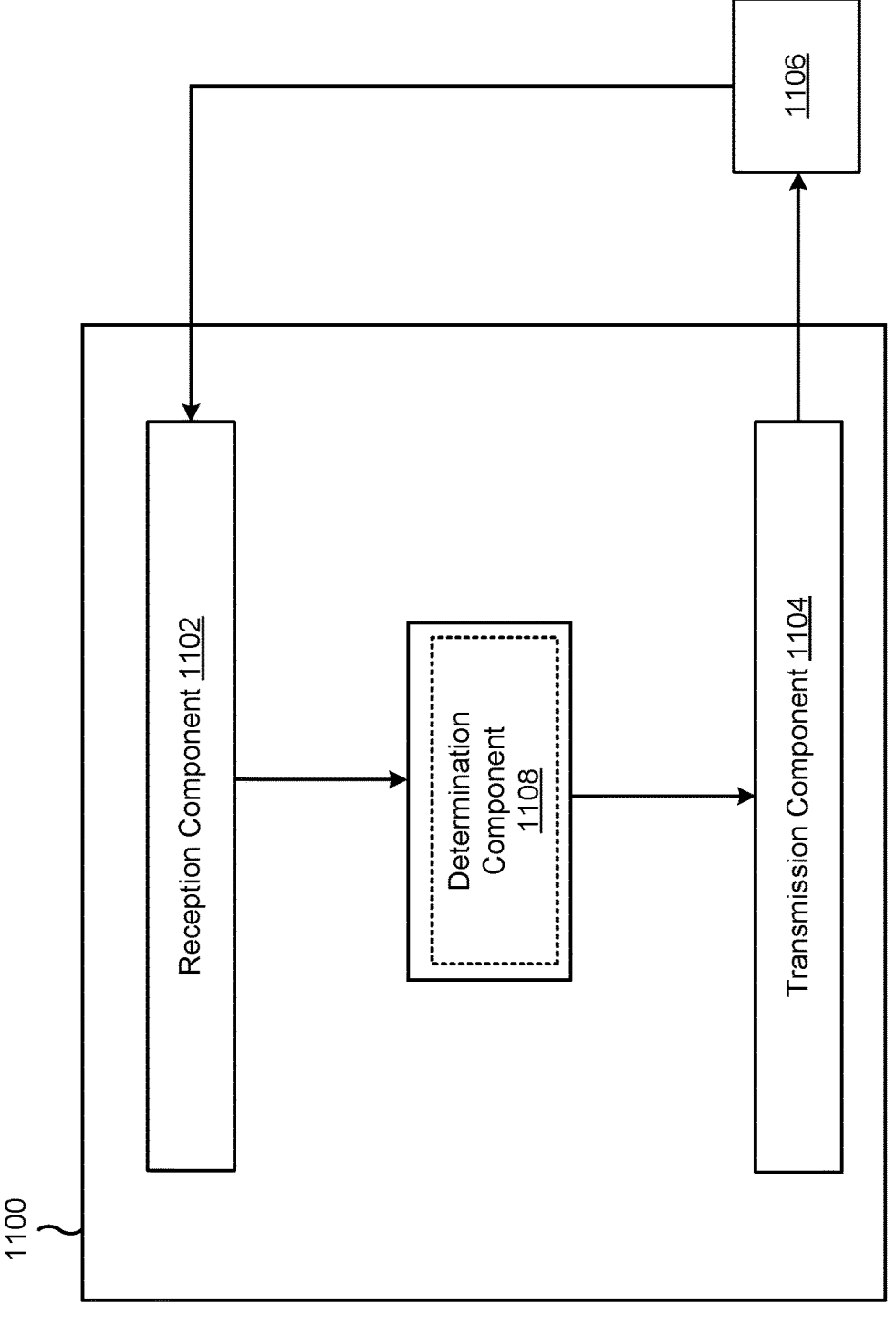
FIG. 11 is a block diagram of an example apparatus for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The transmission component 1104 may transmit capability information indicating a set of band configurations. The reception component 1102 may receive information indicating a band configuration, wherein the band configuration is supported by the apparatus 1100 and is not indicated by the capability information. The transmission component 1104 component or the reception component 1102 may communicate using the band configuration based at least in part on the band configuration being supported by the UE.

The determination component 1108 may determine whether the band configuration is supported by the apparatus 1100. The determination component 1108 may determine whether to indicate invalid configuration based at least in part on whether the band configuration is supported by the apparatus 1100. The determination component 1108 may determine that the band configuration is not indicated by the capability information, wherein the determination of whether the band configuration is supported by the apparatus 1100 is based at least in part on the determination that the band configuration is not indicated by the capability information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting first capability information indicating a first set of band configurations; transmitting, after transmission of the first capability information, second capability information indicating a second set of band configurations; receiving information indicating a band configuration, wherein the band configuration is not included in at least one of the first set of band configurations or the second set of band configurations; and communicating using the band configuration.

Aspect 2: The method of Aspect 1, wherein the band configuration comprises a Long Term Evolution carrier aggregation configuration.

Aspect 3: The method of any of Aspects 1-2, wherein the band configuration comprises a multi radio access technology dual connectivity configuration.

Aspect 4: The method of any of Aspects 1-3, wherein the band configuration comprises a New Radio carrier aggregation configuration.

Aspect 5: The method of any of Aspects 1-4, wherein the band configuration comprises a New Radio dual connectivity configuration.

Aspect 6: The method of any of Aspects 1-5, wherein the band configuration indicates a multiple-input multiple-output configuration for one or more bands.

Aspect 7: The method of any of Aspects 1-6, wherein the band configuration indicates a modulation scheme configuration for one or more bands.

Aspect 8: The method of any of Aspects 1-7, wherein the band configuration relates to a group of bands.

Aspect 9: The method of any of Aspects 1-8, further comprising: determining whether the band configuration is supported by the UE.

Aspect 10: The method of Aspect 9, further comprising determining whether to indicate invalid configuration based at least in part on whether the band configuration is supported by the UE.

Aspect 11: The method of Aspect 9, further comprising: determining that the band configuration is not indicated by the second capability information, wherein the determination of whether the band configuration is supported by the UE is based at least in part on the determination that the band configuration is not indicated by the second capability information.

Aspect 12: The method of Aspect 9, wherein the UE is associated with a first mode and a second mode, wherein, in the first mode, the determination of whether the band configuration is supported by the UE is irrespective of whether the band configuration is indicated by the second capability information, and wherein, in the second mode, the determination of whether the band configuration is supported by the UE is based at least in part on whether the band configuration is indicated by the second capability information.

Aspect 13: The method of any of Aspects 1-12, wherein the second capability information is most recent capability information transmitted by the UE.

Aspect 14: The method of any of Aspects 1-13, wherein the first capability information is based at least in part on a first capability inquiry for information regarding band combinations and the second capability information is based at least in part on a second capability inquiry for information regarding band combinations.

Aspect 15: The method of Aspect 14, wherein the first capability inquiry and the second capability inquiry are associated with different sets of band combinations.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

transmitting first capability information indicating a first set of band configurations;

transmitting, after transmission of the first capability information, second capability information indicating a second set of band configurations;

receiving information indicating a band configuration, wherein the band configuration is not included in at least one of the first set of band configurations or the second set of band configurations;

determining whether the band configuration is supported by the UE, wherein the UE is associated with a mode in which the determination, of whether the band configuration is supported by the UE, is performed when the band configuration is not indicated by the second capability information; and communicating using the band configuration.

2. The method of claim 1, wherein the band configuration comprises a Long Term Evolution carrier aggregation configuration.

3. The method of claim 1, wherein the band configuration comprises a multi radio access technology dual connectivity configuration.

4. The method of claim 1, wherein the band configuration comprises a New Radio carrier aggregation configuration.

5. The method of claim 1, wherein the band configuration comprises a New Radio dual connectivity configuration.

6. The method of claim 1, wherein the band configuration indicates a multiple-input multiple-output configuration for one or more bands.

7. The method of claim 1, wherein the band configuration indicates a modulation scheme configuration for one or more bands.

8. The method of claim 1, wherein the band configuration relates to a group of bands.

9. The method of claim 1, further comprising determining whether to indicate invalid configuration based at least in part on whether the band configuration is supported by the UE.

10. The method of claim 1, further comprising:

determining that the band configuration is not indicated by the second capability information; and determining that the band configuration is supported by the UE based at least in part on the determination that the band configuration is not indicated by the second capability information.

11. The method of claim 1, wherein the UE is associated with another mode in which the determination of whether the band configuration is supported by the UE is based at least in part on whether the band configuration is indicated by the second capability information.

12. The method of claim 1, wherein the second capability information is most recent capability information transmitted by the UE.

13. The method of claim 1, wherein the first capability information is based at least in part on a first capability inquiry for information regarding band combinations and the second capability information is based at least in part on a second capability inquiry for information regarding band combinations.

14. The method of claim 13, wherein the first capability inquiry and the second capability inquiry are associated with different sets of band combinations.

15. A user equipment (UE) for wireless communication, comprising:

one or more antennas; and a processing system that includes one or more processors and one or more memories that store code and are coupled with the one or more processors, the processing system configured to cause the UE to:

transmit first capability information indicating a first set of band configurations;

transmit, after transmission of the first capability information, second capability information indicating a second set of band configurations;

receive information indicating a band configuration, wherein the band configuration is not included in at least one of the first set of band configurations or the second set of band configurations;

determine whether the band configuration is supported by the UE, wherein the UE is associated with a mode in which the determination, of whether the band configuration is supported by the UE, is performed when the band configuration is not indicated by the second capability information; and communicate using the band configuration.

16. The UE of claim 15, wherein the band configuration indicates a multiple-input multiple-output configuration for one or more bands.

17. The UE of claim 15, wherein the band configuration indicates a modulation scheme configuration for one or more bands.

18. The UE of claim 15, wherein the band configuration relates to a group of bands.

19. The UE of claim 15, wherein the processing system is further configured to determine whether to indicate invalid configuration based at least in part on whether the band configuration is supported by the UE.

20. The UE of claim 15, wherein the processing system is further configured to:

determine that the band configuration is not indicated by the second capability information; and determine that the band configuration is supported by the UE based at least in part on the determination that the band configuration is not indicated by the second capability information.

21. A non-transitory computer-readable medium storing a set of instructions for wireless communication, the set of instructions comprising:

one or more instructions that, when executed by one or more processors of a user equipment (UE), cause the UE to:

transmit first capability information indicating a first set of band configurations;

transmit, after transmission of the first capability information, second capability information indicating a second set of band configurations;

receive information indicating a band configuration, wherein the band configuration is not included in at least one of the first set of band configurations or the second set of band configurations;

determine whether the band configuration is supported by the UE, wherein the UE is associated with a mode in which the determination, of whether the band configuration is supported by the UE, is performed when the band configuration is not indicated by the second capability information; and communicate using the band configuration.

22. The non-transitory computer-readable medium of claim 21, wherein the band configuration indicates a multiple-input multiple-output configuration for one or more bands.

23. The non-transitory computer-readable medium of claim 21, wherein the band configuration indicates a modulation scheme configuration for one or more bands.

24. The non-transitory computer-readable medium of claim 21, wherein the band configuration relates to a group of bands.

25. An apparatus for wireless communication, comprising:

means for transmitting first capability information indicating a first set of band configurations;

means for transmitting, after transmission of the first capability information, second capability information indicating a second set of band configurations;

means for receiving information indicating a band configuration, wherein the band configuration is not included in at least one of the first set of band configurations or the second set of band configurations;

means for determining whether the band configuration is supported by the apparatus, wherein the apparatus is associated with a mode in which the determination, of whether the band configuration is supported by the apparatus, is performed when the band configuration is indicated by the second capability information; and means for communicating using the band configuration.

26. The apparatus of claim 25, wherein the band configuration relates to a group of bands.

27. The UE of claim 15, wherein the UE is associated with another mode in which the determination of whether the band configuration is supported by the UE is based at least in part on whether the band configuration is indicated by the second capability information.

28. The UE of claim 15, wherein the band configuration comprises a carrier aggregation configuration.

29. The non-transitory computer-readable medium of claim 21, wherein the UE is associated with another mode in which the determination of whether the band configuration is supported by the UE is based at least in part on whether the band configuration is indicated by the second capability information.

30. The apparatus of claim 25, wherein, in the second mode, the determination of whether the band configuration is supported by the apparatus is based at least in part on whether the band configuration is indicated by the second capability information.

* * * * *